US008737429B2

(12) United States Patent
Chuck et al.

(10) Patent No.: US 8,737,429 B2
(45) Date of Patent: May 27, 2014

(54) BANDWIDTH RECYCLING IN NETWORKS

(75) Inventors: David Haoen Chuck, Ames, IA (US);
Jien Morris Chang, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 569 days.

(21) Appl. No.: 13/084,704

(22) Filed: Apr. 12, 2011

(65) Prior Publication Data

US 2011/0255490 A1    Oct. 20, 2011

Related U.S. Application Data

(60) Provisional application No. 61/325,002, filed on Apr. 16, 2010.

(51) Int. Cl.
*H04J 3/16* (2006.01)
(52) U.S. Cl.
USPC ......... 370/468; 370/230; 370/329; 370/395.4
(58) Field of Classification Search
None
See application file for complete search history.

(56) References Cited

U.S. PATENT DOCUMENTS

| | | | | |
|---|---|---|---|---|
| 7,720,098 | B1 * | 5/2010 | Allen et al. | 370/468 |
| 2002/0083185 | A1 * | 6/2002 | Ruttenberg et al. | 709/232 |
| 2004/0062273 | A1 * | 4/2004 | Frank et al. | 370/468 |
| 2010/0202310 | A1 * | 8/2010 | Lee et al. | 370/252 |

OTHER PUBLICATIONS

Huang, Changling, et al., "Bandwidth Recycling in IEEE 802.16 Networks," Department of Electrical and Computer Engineering, Iowa State University, Apr. 20, 2009, pp. 1-44.
Huang, Changling, et al., "Bandwidth Recycling in IEEE 802.16 Networks," Department of Electrical and Computer Engineering, Iowa State University, Aug. 29, 2009, pp. 1-44.

* cited by examiner

*Primary Examiner* — Chirag Shah
*Assistant Examiner* — Jenkey Van
(74) *Attorney, Agent, or Firm* — McKee, Voorhees & Sease

(57) ABSTRACT

A method for use in a broadband wireless access protocol (such as IEEE 802.16 or Long Term Evolution (LTE)) includes scheduling by a base station a stand-by subscriber station for each subscriber station with uplink (UL) transmission opportunities, transmitting by the base station and over the network, a list of each of the stand-by subscriber stations, determining by the stand-by subscriber stations if there is unused bandwidth reserved for the corresponding subscriber station, communicating to the base station that there is the unused bandwidth, and releasing the unused bandwidth for use by the stand-by subscriber station.

14 Claims, 9 Drawing Sheets

HT: HEADER TYPE          CI: CRC INDICATOR              MSB: MOST SIGNIFICANT BIT
EC: ENCRYPTION CONTROL   EKS: ENCRYPTION KEY SEQUENCE   LSB: LEAST SIGNIFICANT BIT
CID: CONNECTION ID       LEN: LENGTH                    HCS: HEADER CHECK SEQUENCE

BANDWIDTH RECYCLING IN NETWORKS

CROSS-REFERENCE TO RELATED APPLICATIONS

This application claims priority under 35 U.S.C. §119 to provisional application Ser. No. 61/325,002 filed Apr. 16, 2010, herein incorporated by reference in its entirety.

FIELD OF THE INVENTION

The present invention relates to networks and network communications. More particularly, but not exclusively, the present invention relates to bandwidth recycling in networks such as IEEE 802.16 networks and Long Term Evolution (LTE) networks.

BACKGROUND OF THE INVENTION

Although the background of the invention is provided generally in the context of IEEE 802.16 networks, it should be understood that this is merely one example of a type of network with problems that can be addressed by the present invention. The Worldwide Interoperability for Microwave Access (WiMAX), based on IEEE 802.16 standard standards [1] [2], is designed to facilitate services with high transmission rates for data and multimedia applications in metropolitan areas. The physical (PHY) and medium access control (MAC) layers of WiMAX have been specified in the IEEE 802.16 standard. Many advanced communication technologies such as Orthogonal Frequency-Division Multiple Access (OFDMA) and multiple-input and multiple-output (MIMO) are embraced in the standards. Supported by these modern technologies, WiMAX is able to provide a large service coverage, high data rates and QoS guaranteed services. Because of these features, WiMAX is considered as a promising alternative for last mile broadband wireless access (BWA).

In order to provide QoS guaranteed services, the subscriber station (SS) is required to reserve the necessary bandwidth from the base station (BS) before any data transmissions. In order to serve variable bit rate (VBR) applications, the SS tends to keep the reserved bandwidth to maintain the QoS guaranteed services. Thus, the amount of reserved bandwidth transmitted data may be more than the amount of transmitted data and may not be fully utilized all the time. Although the amount of reserved bandwidth is adjustable via making bandwidth requests (BRs), the adjusted bandwidth is applied as early as to the next coming frame. The unused bandwidth in the current frame has no chance to be utilized. Moreover, it is very challenging to adjust the amount of reserved bandwidth precisely. The SS may be exposed to the risk of degrading the QoS requirements of applications due to the insufficient amount of reserved bandwidth.

Thus, despite the promise shown by WiMAX, problems remain with providing the desired QoS without overly decreasing bandwidth utilization. What is needed is improved protocols for implementation in network devices which overcomes these and other deficiencies.

BRIEF SUMMARY

Therefore, it is a primary object, feature, or advantage of the present invention to improve over the state of the art.

It is a further object, feature, or advantage of the invention to provide a protocol which can improve overall system throughput in IEEE 802.16 networks.

Another object, feature, or advantage of the present invention is to use unused bandwidth in IEEE 802.16 networks.

Yet another object, feature, or advantage of the present invention is to improve overall system performance in an IEEE 802.16 network while maintaining the same quality of service (QoS) guaranteeing services.

One or more of these and/or other objects, features, or advantages of the present invention will be apparent from the specification and claims. No single embodiment need exhibit all of these objects, features, or advantages.

According to one aspect of the present invention, a method for use in a broadband wireless access protocol in a network is provided. The method includes scheduling by a base station a stand-by subscriber station for each subscriber station with uplink (UL) transmission opportunities, transmitting by the base station and over the network, a list of each of the stand-by subscriber stations, determining by the stand-by subscriber stations if there is unused bandwidth reserved for the corresponding subscriber station, communicating to the base station that there is the unused bandwidth, and releasing the unused bandwidth for use by the stand-by subscriber station.

According to another aspect of the present invention, a system for communication over a network is provided. The system includes a base station, a plurality of subscriber stations, and a plurality of complementary subscriber station. The base station is configured for scheduling a complementary subscriber station for each of the plurality of subscriber stations and communicating a list containing the complementary subscriber stations. Each of the subscriber stations is configured for sending a stuff byte value to the base station if the subscriber station has unused bandwidth. Each of the subscriber stations is configured for sending a releasing message to a corresponding complementary subscriber station to inform the corresponding complementary subscriber station to recycle the unused bandwidth.

DETAILED DESCRIPTION OF THE PREFERRED EMBODIMENTS

1. Introduction and Overview

Figure 1:
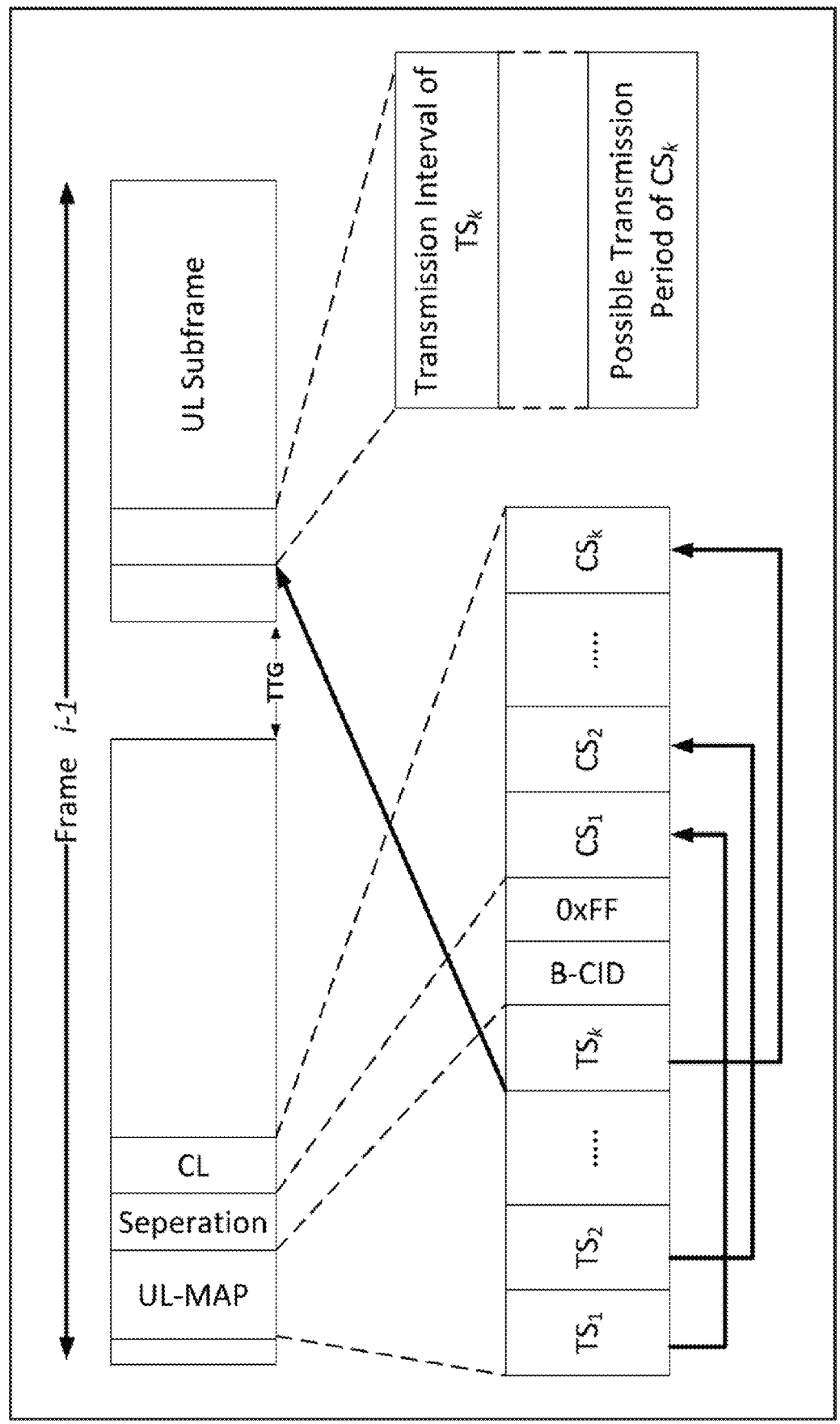
FIG. 1 illustrates the mapping relation between CSs and TSs in a MAC frame.

To improve the bandwidth utilization while maintaining the same QoS guaranteed services, our research objective is twofold: 1) the existing bandwidth reservation is not changed to maintain the same QoS guaranteed services. 2) our research work focuses on increasing the bandwidth utilization by utilizing the unused bandwidth. We propose a scheme, named Bandwidth Recycling, which recycles the unused bandwidth while keeping the same QoS guaranteed services without introducing extra delay. The general concept behind our scheme is to allow other SSs to utilize the unused bandwidth left by the current transmitting SS. Since the unused bandwidth is not supposed to occur regularly, our scheme allows SSs with non-real time applications, which have more flexibility of delay requirements, to recycle the unused bandwidth. Consequently, the unused bandwidth in the current frame can be utilized. It is different from the bandwidth adjustment in which the adjusted bandwidth is enforced as early as in the next coming frame. Moreover, the unused bandwidth is likely to be released temporarily (i.e., only in the current frame) and the existing bandwidth reservation does not change. Therefore, our scheme improves the overall throughput while providing the same QoS guaranteed services.

According to the IEEE 802.16 standard, SSs scheduled on the uplink (UL) map should have transmission opportunities in the current frame. Here, those SSs are called transmission SSs (TSs). The main idea of the proposed scheme is to allow the BS to schedule a backup SS for each TS. The backup SS is assigned to standby for any opportunities to recycle the unused bandwidth of its corresponding TS. We call the backup SS as the complementary station (CS). In the IEEE 802.16 standard, BRs are made in per-connection basis. However, the BS allocates bandwidth in per-SS basis. It gives the SS flexibility to allocate the granted bandwidth to each connection locally. Therefore, the unused bandwidth is defined as the granted bandwidth which is still available after serving all connections running on the SS. In our scheme, when a TS has unused bandwidth, it should transmit a message, called releasing message (RM), to inform its corresponding CS to recycle the unused bandwidth. However, because of the variety of geographical distance between TS and CS and the transmission power of the TS, the CS may not receive the RM. In this case, the benefit of our scheme may be reduced. In this research, we investigate the probability that the CS receives a RM successfully. Our theoretical analysis shows that this probability is least 42%, which is confirmed by our simulation. By further investigating the factors that affect the effectiveness of our scheme, two factors are concluded: 1) the CS cannot receive the RM. 2) the CS does not have non-real time data to transmit while receiving a RM. To mitigate those factors, additional scheduling algorithms are proposed. Our simulation results show that the proposed algorithm further improve the average throughput by 40% in a steady network (i.e., 15~75 second in our simulation).

The rest of this detailed description is organized as follows. In Section 2, we provide the background information of IEEE 802.16. Motivation and related works are presented in Section 3. The proposed scheme is presented in Section 4. The analysis of the proposed scheme and simulation results are placed in Section 5 and Section 6. In Section 7, three additional scheduling algorithms are proposed to enhance the performance of the proposed scheme. The simulation results of each scheduling algorithm are shown in Section 8. At the end, the conclusion is given in Section 9. Although specific embodiments are provided herein, the present invention is not to be limited to the specific embodiments.

2. Background Information

The IEEE 802.16 standard specifies three types of transmission mediums supported as the physical layer (PHY): single channel (SC), Orthogonal frequency-division multiplexing (OFDM) and Orthogonal Frequency-Division Multiple Access (OFDMA). We assume OFDMA as the PHY in our analytical model since it is employed to support mobility in IEEE 802.16e standard and the scheme working in OFDMA should also work in others. There are four types of modulations supported by OFDMA: BPSK, QPSK, 16-QAM and 64-QAM.

In a preferred embodiment of the present invention, the point-to-multipoint (PMP) mode in which the SS is not allowed to communicate with any other SSs but the BS directly. Based on the transmission direction, the transmissions between BS and SSs are classified into downlink (DL) and uplink (UL) transmissions. The former are the transmissions from the BS to SSs. Conversely, the latter are the transmissions in the opposite direction.

There are two transmission modes: Time Division Duplex (TDD) and Frequency Division Duplex (FDD) supported in IEEE 802.16. Both UL and DL transmissions can not be operated simultaneously in TDD mode but in FDD mode. In a preferred embodiment, our scheme is focused on the TDD mode. In WiMAX, the BS is responsible for scheduling both UL and DL transmissions. All scheduling behavior is expressed in a MAC frame.

The structure of a MAC frame defined in IEEE 802.16 standard contains two parts: UL and DL subframe. The UL subframe is for UL transmissions. Similarly, the DL subframe is for DL transmissions. In IEEE 802.16 networks, the SS is coordinated by the BS. All coordinating information including burst profiles and offsets is in the DL and UL maps, which are broadcasted at the beginning of a MAC frame.

The IEEE 802.16 network is connection-oriented. It gives the advantage of having better control over network resource to provide QoS guaranteed services. In order to support wide variety of applications, the IEEE 802.16 standard classifies traffic into five scheduling classes: Unsolicited Grant Service (UGS), Real Time Polling Service (rtPS), Non-real Time Polling Service (nrtPS), Best Effort (BE) and Extended Real Time Polling Service (ertPS). Each application is classified into one of the scheduling classes and establish a connection with the BS based on its scheduling class. The BS assigns a connection ID (CID) to each connection. The bandwidth reservation is made based on the CID via sending a BR. When receiving a BR, the BS can either grant or reject the BR depending on its available resources and scheduling policies.

There are two types of BRs defined in the IEEE 802.16 standard: incremental and aggregate BRs. The former allow the SS to indicate the extra bandwidth required for a connection. Thus, the amount of reserved bandwidth can be only increased via incremental BRs. On the other hand, the SS specifies the current state of queue for the particular connection via a aggregate request. The BS resets its perception of that service's needs upon receiving the request. Consequently, the reserved bandwidth may be decreased.

3. Motivation and Related Work

Bandwidth reservation allows IEEE 802.16 networks to provide QoS guaranteed services. The SS reserves the required bandwidth before any data transmissions. Due to the nature of VBR applications, it is very difficult for the SS to make the optimal bandwidth reservation. It is possible that the amount of reserved bandwidth is more than the demand. Therefore, the reserved bandwidth cannot be fully utilized. Although the reserved bandwidth can be adjusted via BRs, however, the updated reserved bandwidth is applied as early as to the next coming frame and there is no way to utilize the unused bandwidth in the current frame. In our scheme, the SS releases its unused bandwidth in the current frame and another SS pre-assigned by the BS has opportunities to utilize this unused bandwidth. This improves the bandwidth utilization. Moreover, since the existing bandwidth reservation is not changed, the same QoS guaranteed services are provided without introducing any extra delay.

Many research works related to bandwidth utilization improvement have been proposed in the literature. In [4], a dynamic resource reservation mechanism is proposed. It can dynamically change the amount of reserved resource depending on the actual number of active connections. The investigation of dynamic bandwidth reservation for hybrid networks is presented in [3]. The authors evaluated the performance and effectiveness for the hybrid network, and proposed efficient methods to ensure optimum reservation and utilization of bandwidth while minimizing signal blocking probability and signaling cost. In [5], the authors enhanced the system throughput by using concurrent transmission in mesh mode. The authors in [6] proposed a new QoS control scheme by considering MAC-PHY cross-layer resource allocation. A dynamic bandwidth request-allocation algorithm for real-time services is proposed in [7]. The authors predict the amount of bandwidth to be requested based on the information of the backlogged amount of traffic in the queue and the rate mismatch between packet arrival and service rate to improve the bandwidth utilization. The research works listed above improve the performance by predicting the traffic coming in the future. Instead of prediction, our scheme can allow SSs to accurately identify the portion of unused bandwidth and provides a method to recycle the unused bandwidth. It can improve the utilization of bandwidth while keeping the same QoS guaranteed services and introducing no extra delay.

4. Proposed Scheme

The objectives of our research are two fold: 1) The same QoS guaranteed services are provided by maintaining the existing bandwidth reservation. 2) the bandwidth utilization is improved by recycling the unused bandwidth. To achieve these objectives, our scheme named Bandwidth Recycling is proposed. The main idea of the proposed scheme is to allow the BS to pre-assign a CS for each TS at the beginning of a frame. The CS waits for the possible opportunities to recycle the unused bandwidth of its corresponding TS in this frame. The CS information scheduled by the BS is resided in a list, called complementary list (CL). The CL includes the mapping relation between each pair of pre-assigned CS and TS. As shown in FIG. 1, each CS is mapped to at least one TS. The CL is broadcasted followed by the UL map. To reach the backward compatibility, a broadcast CID (B-CID) is attached in front of the CL. Moreover, a stuff byte value (SBV) is transmitted followed by the B-CID to distinguish the CL from other broadcast DL transmission intervals.

The UL map including burst profiles and offsets of each TS is received by all SSs within the network. Thus, if a SS is on both UL map and CL, the necessary information (e.g., burst profile) residing in the CL may be reduced to the mapping information between the CS and its corresponding TS. The BS only specifies the burst profiles for the SSs which are only scheduled on the CL. For example, as shown in FIG. 1, CS, is scheduled as the corresponding CS of $TS_j$, where $1 \leq j \leq k$. When $TS_j$ has unused bandwidth, it performs our protocol introduced in Section 4.1. If $CS_j$ receives the message sent from $TS_j$, it starts to transmit data by using the agreed burst profile. The burst profile of a CS is resided on either the UL map if the CS is also scheduled on the UL map or the CL if the CS is only scheduled on CL. Our proposed scheme is presented into two parts: the protocol and the scheduling algorithm. The protocol describes how the TS identifies the unused bandwidth and informs recycling opportunities to its corresponding CS. The scheduling algorithm helps the BS to schedule a CS for each TS.

4.1 Protocol

According to the IEEE 802.16 standard, the allocated space within a data burst that is unused should be initialized to a known state. Each unused byte should be set as a padding value (i.e., 0xFF), called stuffed byte value (SBV). If the size of the unused region is at least the size of a MAC header, the entire unused region is initialized as a MAC PDU. The padding CID is used in the CID field of the MAC PDU header. In this research, we intend to recycle the unused space for data transmissions.

Figure 2:
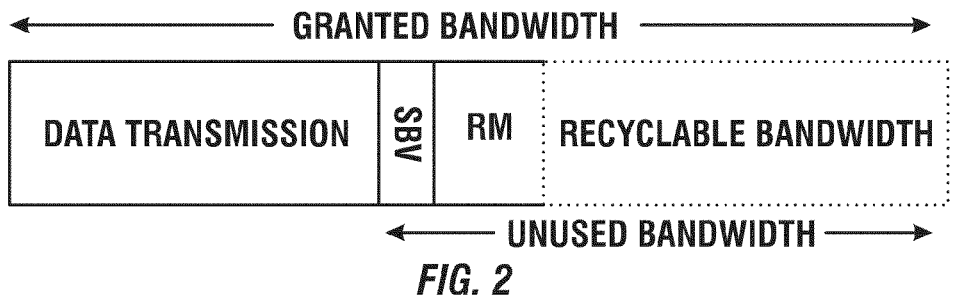
FIG. 2 illustrates messages to release the unused bandwidth within the UL transmission interval.
Figure 3:
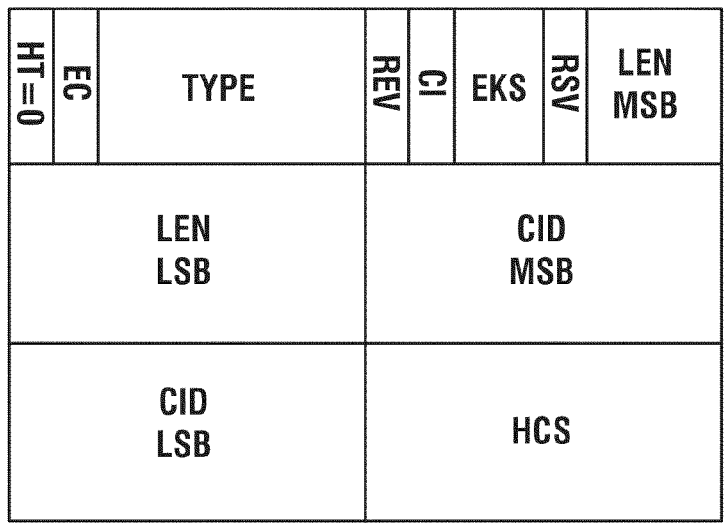
FIG. 3 illustrates the format of RM.

Instead of padding all portion of the unused bandwidth in our scheme, a TS with unused bandwidth transmits only a SBV and a RM shown in FIG. 2. The SBV is used to inform the BS that no more data are coming from the TS. On the other hand, the RM comprises a generic MAC PDU with no payload shown in FIG. 3. The mapping information between CL and UL map is based on the basic CID of each SS. The CID field in RM should be filled by the basic CID of the TS.

Since there is an agreement of modulation for transmissions between TS and BS, the SBV can be transmitted via this agreed modulation. However, there are no agreed modulations between TS and CS. Moreover, the transmission coverage of the RM should be as large as possible in order to maximize the probability that the RM is able to be received successfully by the CS. To maximize the transmission coverage of the RM, one possible solution is to increase the transmission power of the TS while transmitting the RM. However, the power may be a critical resource for the TS and should not be increased dramatically. Therefore, under the circumstance of without increasing the transmission power of the TS, the RM should be transmitted via BPSK which has the largest coverage among all modulations supported in the IEEE 802.16 standard.

Figure 4:
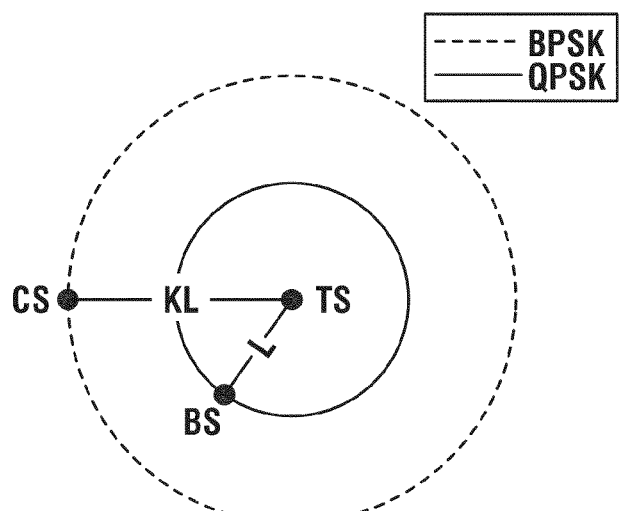
FIG. 4 illustrates an example of corresponding location of TS, BS and CS.

For example, FIG. 4 illustrates the physical location of the BS, TS and CS, respectively. The solid circle represents the coverage of QPSK which is the modulation for data transmissions between BS and TS. When the TS has unused bandwidth, it transmits a SBV via this modulation (i.e., QPSK) to inform the BS that there are no more data coming from the TS. It is easy to observe that the corresponding CS is out of QPSK coverage. In order to maximize the coverage of the RM under the circumstance of without increasing the transmission power of the TS, the TS transmits the RM via BPSK which coverage is represented by the dished circle. The radius of the dished circle is KL, where L is the distance between TS and BS and K is the ratio of transmission range of BPSK to the transmission range of QPSK depending on the transmission power. Assume all channels are in good condition. As long as the CS is within the coverage of BPSK, it can receive the RM successfully and start to recycle the unused bandwidth.

Since both UL map and CL can be received by the CS, the CS knows the UL transmission period of its corresponding TS. This period is called the UL transmission interval. The CS monitors this interval to see if a RM is received from its corresponding TS. Once received, the CS starts to recycle the unused bandwidth by using the burst profile residing in either UL map (if the CS is scheduled on the UL map) or CL (if the CS is only scheduled on the CL), until using up the rest of the TS's transmission interval. If the CS does not have any data to transmit, it simply pads the rest of the transmission interval.

4.2 Scheduling Algorithm

Assume Q represents the set of SSs serving non-real time connections (i.e., nrtPS or BE connections) and T is the set of TSs. Due to the feature of TDD that the UL and DL operations can not be performed simultaneously, we can not schedule the SS which UL transmission interval is overlapped with the target TS. For any TS, $S_t$, let $O_t$ be the set of SSs which UL transmission interval overlaps with that of $S_t$ in Q. Thus, the possible corresponding CS of $S_t$ must be in $Q-O_t$. All SSs in $Q-O_t$ are considered as candidates of the CS for $S_t$. A scheduling algorithm, called Priority-based Scheduling Algorithm (PSA), shown in Algorithm 1 is used to schedule a SS with the highest priority as the CS. The priority of each candidate is decided based on the scheduling factor (SF) defined as the ratio of the current requested bandwidth (CR) to the current granted bandwidth (CG). The SS with higher SF has more demand on the bandwidth. Thus, we give the higher priority to those SSs. The highest priority is given to the SSs with zero CG. Non-real time connections include nrtPS and BE connections. The nrtPS connections should have higher priority than the BE connections because of the QoS requirements. The priority of candidates of CSs is concluded from high to low as: nrtPS with zero CG, BE with zero CG, nrtPS with non-zero CG and BE with non-zero CG. If there are more than one SS with the highest priority, we select one with the largest CR as the CS in order to decrease the probability of overflow.

5. Analysis

The percentage of potentially unused bandwidth occupied in the reserved bandwidth is critical for the potential performance gain of our scheme. We investigate this percentage on VBR traffics which is popularly used today. Additionally, in our scheme, each TS should transmit a RM to inform its corresponding CS when it has unused bandwidth. However, the transmission range of the TS may not be able to cover the corresponding CS. It depends on the location and the transmission power of the TS. It is possible that the unused bandwidth cannot be recycled because the CS does not receive the RM. Therefore, the benefit of our scheme is reduced. In this section, we analyze mathematically the probability of a CS to receive a RM successfully. Obviously, this probability affects the bandwidth recycling rate (BBR). BBR stands for the percentage of the unused bandwidth which is recycled. Moreover, the performance analysis is presented in terms of throughput gain (TG). At the end, we evaluate the performance of our scheme under different traffic load. All analytical results are validated by the simulation in Section 6.

| Algorithm 1 Priority-based Scheduling Algorithm | |
|---|---|
| Input: | T is the set of TSs scheduled on the UL map. |
| | Q is the set of SSs running non-real time applications. |
| Output: | Schedule CSs for all TSs in T. |
| For i = | 1 to ‖T‖ do |
| | a. $S_t \leftarrow TS_i$ |
| | b. $Q_t \leftarrow Q\text{-}O_t$ |
| | c. Calculate the SF for each SS in $Q_t$. |
| | d. If Any SS ∈ $Q_t$ has zero granted bandwidth, |
| |    If Any SSs have nrtPS traffics and zero granted bandwidth, |
| |       Choose one running nrtPS traffics with the largest CR. |
| |    else |
| |       Choose one with the largest CR. |
| |    else |
| |       Choose one with the largest SF and CR. |
| | e. Schedule the SS as the corresponding CS of $S_t$. |
| End For | |

5.1 Analysis of Potential Unused Bandwidth

Based on the traffic generation rate, the applications can be classified into two types: constant bit rate (CBR) and variable bit rate (VBR). Since CBR applications generate data in a constant rate, SSs rarely adjust the reserved bandwidth. As long as the reasonable amount of bandwidth is reserved, it is hard to have unused bandwidth in this type of applications. Therefore, our scheme has very limited benefit on CBR traffic. However, VBR applications generate data in a variable rate. It is hard for a SS to predict the amount of incoming data precisely for making the appropriate bandwidth reservation. Thus, in order to provide QoS guaranteed services, the SS tends to keep the amount of reserved bandwidth to serve the possible bursty data arrived in the future. The reserved bandwidth may not be fully utilized all the time. Our analysis focuses on investigating the percentage of potentially unused bandwidth of VBR traffics.

In our traffic model based on [8], the time interval between arriving packets of the VBR traffic is considered as exponential distribution. The steady state probability of the traffic model can be characterized by Poisson distribution. Let $\lambda$ and $\lambda_{max}$ be the mean and maximal amount of data arriving in a frame, respectively. Suppose X represents the amount of data arriving in a frame and p(X) is the probability of X amount of data arriving in a frame, where $0 \leq X \leq \lambda_{max}$.

When the SS intends to establish a new connection with the BS, this connection must pass the admission control in order to ensure that the BS has enough resource to provide QoS guaranteed services. The policy can be considered as a set of predefined QoS parameters such as minimum reserved traffic rate ($R_{min}$), maximum sustained rate ($R_{max}$) and maximum burst size ($W_{max}$) [9] [10]. In our analytic model, the BS initially assigns the bandwidth, B, to each connection. The BS guarantees to support the bandwidth until reaching $R_{min}$ and optionally to reach $R_{max}$. Suppose $D_f$ represents the frame duration and W is the assigned bandwidth per frame (in terms of bytes). Because of the admission control policy, the burst size that the BS schedules in each frame cannot be larger than $W_{max}$. The relation between W and B can be formulated as:

$$W = BD_f \leq W_{max} \quad (1)$$

Suppose $X_{i-1}$ represents the amount of data arriving in the frame i−1 (in terms of bytes), where $1 \leq i \leq N-1$ and N is the total number of frames we analyze. If we have unused bandwidth in frame i, then the amount of data in queue must be less than the number of assigned bandwidth. By considering the inter-frame dependence (i.e., the number of data changed in the previous frame affects the number of data in queue in the current frame), it can be represented as the following condition:

$$X_{i-1} < W_i - \max\{0, Q_{i-1} - W_{i-1}\} \quad (2)$$

where $Q_{i-1}$ is the amount of data stored in queue before transmitting frame i−1. $W_i$ and $W_{i-1}$ are the amount of bandwidth assigned in frame i and i−1, respectively. Again, both $W_i$ and $W_{i-1}$ are at most $W_{max}$. $\max\{0, Q_{i-1} - W_{i-1}\}$ represents the amount of queued data arriving before frame i−1.

As mentioned, $X_{i-1}$ is the amount of data arriving in the frame i−1. Thus, $X_{i-1}$ must be nonnegative. Consequently, the probability of having unused bandwidth in frame i, $P_u(i)$, is derived as:

$$P_u(i) = \int_0^{x_{i-1}} p(X) dX \quad (3)$$

Thus, the expected amount of unused bandwidth in frame i, E(i), can be derived as:

$$E(i) = \int_0^{x_{i-1}} X p(X) dX \quad (4)$$

Finally, by summing the expected unused bandwidth in all frames, the ratio of the total potentially unused bandwidth to total reserved bandwidth in N frames, $R_u$, can be presented as:

$$R_u = \frac{\sum_{i=0}^{N-1} E(i)}{\sum_{i=0}^{N-1} W_i} \quad (5)$$

5.2 The Probability of RMs Received by the Corresponding CSs Successfully

Assume a BS resides at the center of a geographical area. There are n SSs uniformly distributed in the coverage area of the BS. Since PMP mode is considered, the transmissions only exist between BS and SSs. Moreover, each SS may be in different locations. The transmission rate of each SS may be variant depending on the PHY transmission technology and transmission power. For a given SS, $S_t$, let $R_t^{(B)}$, $R_t^{(Q)}$, $R_t^{(16)}$ and $R_t^{(64)}$ denote as the transmission range of BPSK, QPSK, 16-QAM and 64-QAM, respectively. In our scheme, the RM should be transmitted via the most robust modulation (i.e., BPSK) since it has the largest coverage of RMs among all modulations supported by the IEEE 802.16 standard without adjusting the transmission power. Based on the fixed transmission power, the relation of transmission range between modulations is expressed as:

$$R_t^{(B)} = k_t^{(Q)} R_t^{(Q)} = k_t^{(16)} R_t^{(16)} = k_t^{(64)} R_t^{(64)}$$

where $k_t^{(Q)}$, $k_t^{(16)}$ and $k_t^{(64)}$ are constants depending on the transmission power of $S_t$ and $k_t^{(64)} \geq k_t^{(16)} \geq k_t^{(Q)} \geq 1$. Again, the RM should be transmitted via BPSK. Here, we use $R_t$ to represent the BPSK transmission range of $S_t$. Moreover, $S_B$ and R are denoted the BS and its transmission range of BPSK, respectively.

Each TS may use different transmission power to communicate with the BS, depending on the distance between them and the modulation used for communications. In our scheme, we do not intend to change the transmission power. Therefore, the RM should be transmitted via BPSK to maximize the transmission coverage. However, the transmission coverage of the RM may not be able to cover the whole service area of $S_B$. Consequently, the CS may not able to receive the RM. Furthermore, it is worth noticing that the location of the TS also affects the probability of a CS to receive the RM. Therefore, we must analyze the probability that a CS receives a RM from its corresponding TS successfully.

From the UL map and CL, the CS obtains the UL transmission interval of its corresponding TS. Thus, the CS starts to expect a RM at the beginning of the UL transmission interval of its corresponding TS. Additionally, since SSs are randomly distributed in the service area of $S_B$, the probability of a CS to receive a RM equals to the ratio of the transmission coverage of a RM to the service coverage of $S_B$. We analyze the average value of this probability.

Figure 5A:
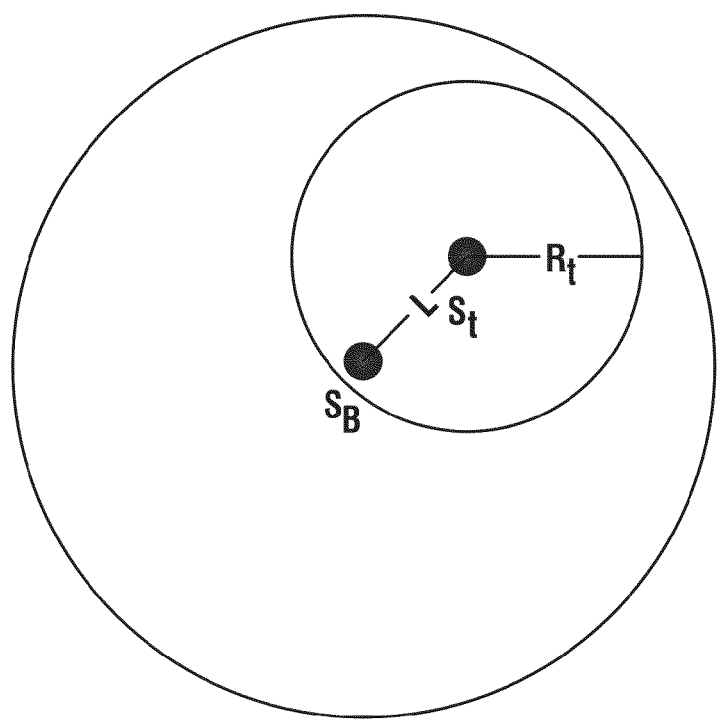
FIG. 5 illustrates possible geographical relationship between $S_t$ and $S_B$.

For any TS $S_t$, suppose $S_j$ is denoted as the CS of $S_t$. The relation between $S_t$ and $S_B$ can be classified into two categories based on the location of $S_t$: 1) all coverage of $S_t$ is within the service coverage of $S_B$ as shown in FIG. 5(a). 2) only part of the coverage of $S_t$ is within the service coverage of $S_B$, shown as FIG. 5(b). The coverage of $S_t$ means the maximal coverage of RMs transmitted by $S_t$. The analysis of each category is presented as follows.

5.2.1 The Coverage of $S_t$ is within the Coverage of $S_B$

In this category, the coverage of $S_t$, denoted as $A_{in}$, can be derived as:

$$A_{in} = \pi R_t^2 \quad (6)$$

The probability of $S_j$ receiving a RM, denoted as $P_c(t)$, is the same as the ratio of converges of $S_t$ to $S_B$:

$$P_c(t) = \frac{R_t^2}{R^2} \quad (7)$$

Moreover, the coverage of the two stations ($S_t$ and $S_B$) must intersect on no more than one point. Suppose L represents the distance between $S_t$ and $S_B$. The condition to have this type of situation can be expressed in terms of L:

$$L \leq R - R_t \quad (8)$$

Because $R_t$ represents the BPSK transmission range of $S_t$, we can have:

$$R_t = KL \quad (9)$$

where K is a constant depending on the transmission power and modulation that $S_t$ uses to communicate with $S_B$. By combining equations (8) and (9), $S_t$ belongs to this category if:

$$L \leq \frac{R}{K+1} \quad (10)$$

By calculating the area with radius L, the probability of $S_t$ within this category, $P_{oc}(t)$, is $$P_{oc}(t) = \frac{1}{(K+1)^2} \quad (11)$$

5.2.2 The Coverage of $S_t$ is Partially within the Coverage of $S_B$

Figure 5B:
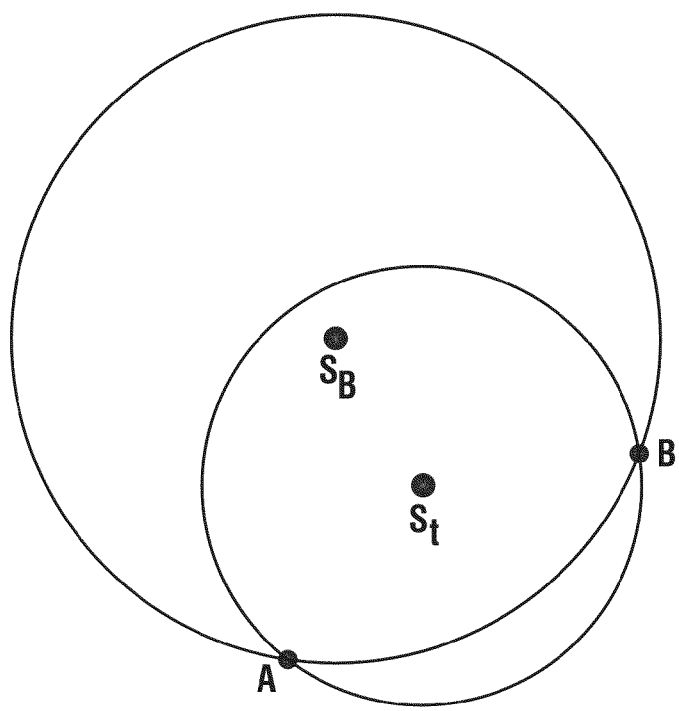
Figure 6:
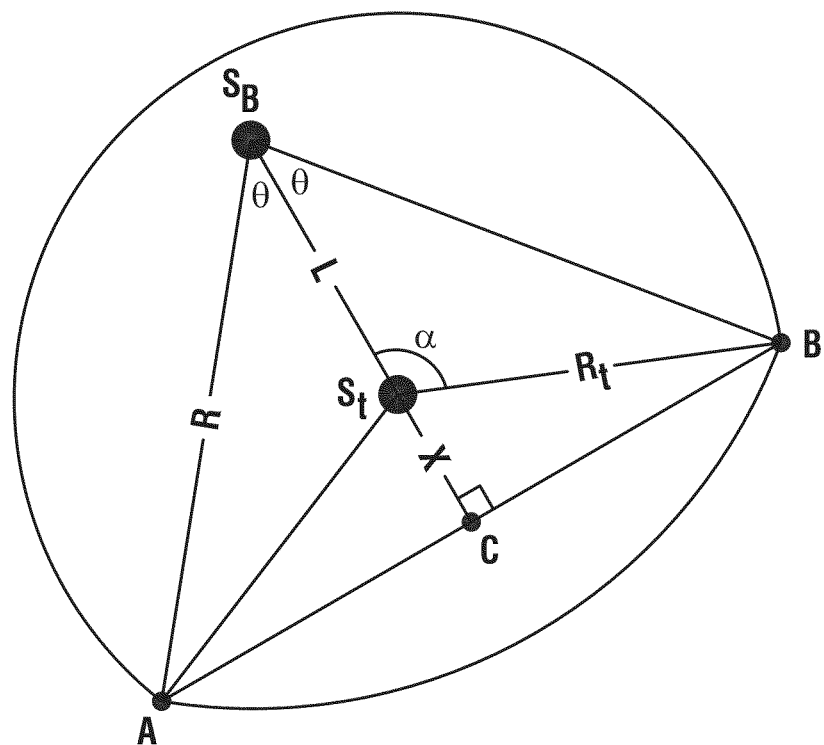
FIG. 6 illustrates both $S_B$ and $S_t$ are in the same side of $\overline{AB}$.

The boundary of $S_t$ intersects with the boundary of $S_B$ at two points, A and B, as shown in FIG. 5(b). Based on the location of $S_t$, we can classify into two cases:

1. Both $S_t$ and $S_B$ are on the same side of $\overline{AB}$:

FIG. 6 illustrates the RM coverage of $S_t$ overlapping with the service area of $S_B$ and both stations reside on the same side of $\overline{AB}$. The total area, $A_{total}$, is presented as:

$$A_{total} = R^2\theta + R_t^2\alpha - LL_2 \quad (12)$$

Consequently, the probability of $S_j$ receiving the RM, $P_s(t)$, is derived as:

$$P_s(t) = \frac{R^2\theta + R_t^2\alpha - LL_2}{\pi R^2} \quad (13)$$

In this case, the borders of both $S_t$ and $S_B$ coverage must intersect on two points. From equation (10), L must be longer $$\frac{R}{K+1}$$

which is the lower bound of this case. Moreover, since both $S_B$ and $S_t$ must reside on the same side of $\overline{AB}$, L must be no longer than the shortest distance from BS to $\overline{AB}$. Thus, we derive the upper bound of L as:

$$L \leq \frac{R}{\sqrt{1+K^2}} \quad (14)$$

By calculating the ring area between lower bound and upper bound, the probability of $S_t$ in this case, $P_{os}(t)$, can be derived as:

$$P_{os}(t) = \frac{2K}{(K+1)^2(1+K^2)} \quad (15)$$

Figure 7:
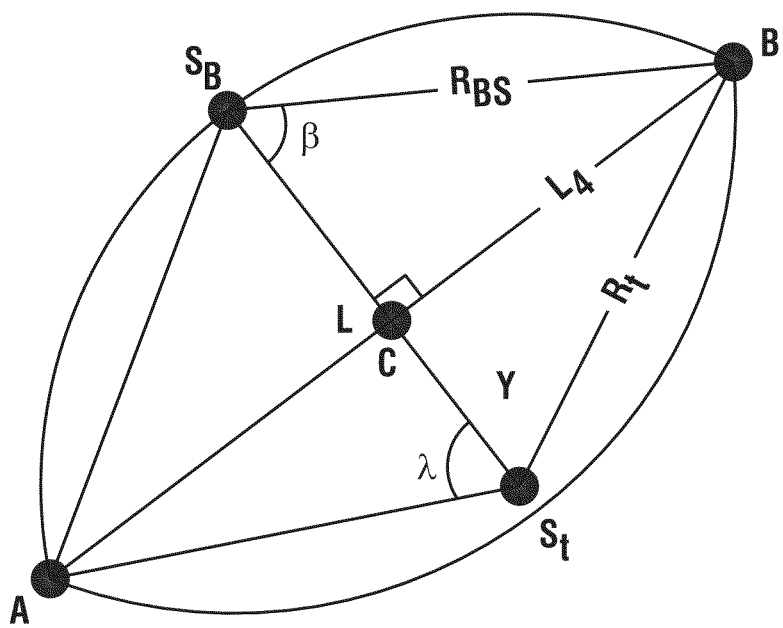
FIG. 7 illustrates $S_B$ and $S_t$ are in the same side of $\overline{AB}$.

II. $S_B$ and $S_t$ are on different side of $\overline{AB}$:

FIG. 7 illustrates the overlapping coverage of $S_t$ and $S_B$. Each of them locates on one side of $\overline{AB}$. The total area, $A'_{total}$, that $S_j$ receives the RM is:

$$A'_{total} = R^2\beta + R_i^2\lambda - LL_4 \quad (16)$$

Therefore, the probability of $S_j$ receiving RMs is derived as:

$$P_e(t) = \frac{R^2\beta + R_i^2\lambda - LL_4}{\pi R^2} \quad (17)$$

Since each of $S_t$ and $S_B$ is in one side of $\overline{AB}$, the distance between $S_t$ and $S_B$ must be longer than the shortest distance from $S_B$ to $\overline{AB}$. From equation (14), we can obtain that L must be longer than $$\frac{R}{\sqrt{1+K^2}}$$

which is the lower bound of this case. Moreover, $S_t$ needs to stay in the service area of $S_B$. Thus, L cannot be no longer than R. By calculating the ring area between lower bound and upper bound of L, the probability of $S_t$ belonging to this case, $P_{oe}(t)$, can be derived as:

$$P_{oe}(t) = \frac{K^2}{1+K^2} \quad (18)$$

From the two categories shown above, the probability of $S_j$ to receive a RM from $S_t$ is concluded as $$P_t(t)P_e(t)P_{oe}(t)P_{os}(t)+P_c(t)P_{oc}(t) \quad (19)$$

Consequently, in average, the probability of a CS to receive the RM from its corresponding TS is derived as:

$$P_t = \frac{\sum_{t=1}^{\|T\|} P_t(t)}{\|T\|} \quad (20)$$

where T is the set of all TSs.

5.3 Performance Analysis of Proposed Scheme

Assume $Q_n$ represents a set of SSs running non-real time connections and $Q_{CL}$ is a set of SSs in $Q_n$ scheduled as CSs. Thus, $\|Q_{CL}\|$ is at most $\|T\|$, where T is the set of all TSs. For any SS, $S_n \in Q_n$, the probability of Sn scheduled on the CL, $P_{CL}(n)$, is derived as:

$$P_{CL}(n) = \begin{cases} \frac{\|Q_{CL}\|}{\|Q_n\|} & \|Q_n\| \geq \|Q_{CL}\| \\ 1 & \text{Otherwise} \end{cases} \quad (21)$$

It is possible that the CS fails to recycle the unused bandwidth due to the lack of no-real time data to be transmitted. Thus, it is necessary to analyze this probability. Suppose $Y_{i-1}$ is the amount of non-real time data arriving in frame i−1. The amount of bandwidth assigned in frame i and i−1 are denoted $W_i^{nrt}$ and $W_{i-1}^{nrt}$, respectively. Obviously, both $W_i^{nrt}$ and $W_{i-1}^{nrt}$ cannot be larger than $W_{max}^{nrt}$, where $W_{max}^{nrt}$ is the maximum burst size. If the CS recycles the unused bandwidth in frame i, then the amount of data in queue must be more than $W_i^{nrt}$. In the consideration of inter-frame dependence, it can be expressed as the following condition:

$$Y_{i-1} > W_i^{nrt} - \max\{0, Q_{i-1}^{nrt} - W_{i-1}^{nrt}\} \quad (22)$$

where $\max\{0, Q_{i-1}^{nrt} - W_{i-1}^{nrt}\}$ is the amount of queued data arriving before frame i−1. Since $Y_{i-1}$ cannot be negative, the probability of the CS, denoted as $S_u$, which has data to recycle the unused bandwidth can be obtained as:

$$P_u(u) = \int_{Y_{i-1}}^{\lambda_{max}^{nrt}} P(X) dX \quad (23)$$

where $\lambda_{max}^{nrt}$ is the maximal amount of non-real time data arriving in a frame.

A CS which recycles the unused bandwidth successfully while receiving a RM must be scheduled on the CS and have non-real time data to be transmitted. From equations (21) and (23), the probability that a CS satisfies these two conditions is derived as:

$$P_r = \frac{\sum_{j=1}^{\|Q_n\|} P_u(j)(P_{CL}(j))}{\|Q_n\|} \quad (24)$$

If the CS recycles the unused bandwidth successfully, then it must meet the three conditions: 1) a RM must be received, 2) this SS must be scheduled on the CL and 3) the CS must have data to recycle the unused bandwidth. From equations (20) and (24), the recycling rate, the average probability that a CS recycles the unused bandwidth successfully, can be obtained as:

$$P_{recycle} = P_r P_t \quad (25)$$

Suppose $B_g$ is the total bandwidth in the system and the unused bandwidth of the system is $B_w$. By equation (25), The total throughput gain, TG, is derived as:

$$TG = \frac{P_{recycle} B_w}{B_g - B_w} \quad (26)$$

Delay is a critical factor affecting the QoS of services. In our scheme, we preserve the existing bandwidth reservation. Moreover, the CS cannot recycle the bandwidth until receiving the RM which is sent by the TS. Therefore, Bandwidth Recycling does not affect any data transmissions operated by the TS and thus, does not introduce any extra delay.

5.4 Overhead Analysis of Proposed Scheme

The overhead introduced by our scheme resides in both DL and UL subframes. In DL subframe, the separation and CL are considered as the overhead. As shown in FIG. 1, the separation contains a broadcast CID (B-CID) and a SBV (0xFF). It costs 3 bytes of overhead (16 bits for B-CID and one byte for SBV). In addition, The CL is composed by the CL information elements (CL-IEs). The CL-IE contains the basic CID of the CS. If the CS is not scheduled on the UL map, the burst profile and offset must be specified in the CL-IE of this CS. Therefore, the size of CL-IE is at most the size of UL-MAP IE which is 7 bytes defined in the IEEE 802.16 standard. In summary, the total overhead in a DL subframe can be concluded as:

$$OT_{DL} \leq 3 + 7B_{TS} \quad (27)$$

where $B_{TS}$ is the number of TSs scheduled on the UL map.

According to the IEEE 802.16 standard, the SBV is inevitable when the SS has unused bandwidth. Therefore, only RMs are considered as the overhead in UL subframe. Each TS transmits at most one RM in each UL subframe. ARM comprises a generic MAC Header (GMH). The size of a GMH is 6 bytes defined in the IEEE 802.16 standard. Thus, the total overhead in an UL subframe is calculated as:

$$OH_{UL} < 6B_{TS} \quad (28)$$

where $B_{TS}$ is the number of TSs scheduled on the UL map. From equation (27) and (28), the total overhead introduced by our scheme in a MAC frame is concluded as:

$$OH = OH_{DL} + OH_{DL} \leq 3 + 7B_{TS} + 6B_{TS} \quad (29)$$

5.5 Performance Analysis of the Proposed Scheme Under Different Traffic Load

The traffic load in a network may vary dynamically. Thus, the network status can be classified into four stages: light, moderate, heavy and fully loaded. The performance of the proposed scheme may be variant in different stages. We investigate the performance of our scheme in each stage. Suppose $B_{all}$ represents the total bandwidth supported by the BS. Assume $B_{rt}$ represents the bandwidth reserved by real time connections and $BR_{rt}$ is the amount of additional bandwidth requested by them via BRs. Similarly $B_{nrt}$ represents the bandwidth assigned to non-real time connections and $BR_{nrt}$ is the amount of additional bandwidth requested by them. The investigation of our scheme in each stage is shown as follows. All investigations are validated via simulation in Section 6.

1) Stage 1 (Light Load):
This stage is defined as that the total demanding bandwidth of SSs is much less than the supply of the BS. The formal definition can be expressed as:

$$B_{all} >> B_{rt} + B_{nrt} + BR_{rt} + BR_{nrt}.$$

Since all BRs are granted in this stage, the BS schedules the CS randomly. Moreover, every SS receives its desired amount of bandwidth. Therefore, for any given CS, $S_u$, the probability to have data to recycle the unused bandwidth, derived from equation (23), is small. It leads to low $P_r$ (from equation (24)). Therefore, the probability that the CS recycles the unused bandwidth successfully is small and the throughput gain of our scheme is not significant.

2) Stage 2 (Moderate Load):
This network stage is defined as equal demand and supply of bandwidth, i.e., $$B_{all} = B_{rt} + Bnrt$$

In this stage, the BS can satisfy the existing demand but does not have available resource to admit new BRs. Since the currently desired bandwidth of every SS can be satisfied, the probability of CS to recycle the unused bandwidth (equation (23)) may be higher than the stage 1 but still limited. Based on equation (24), (25) and (26), the throughput gain is still insignificant.

3) Stage 3 (Heavy Load):
This stage is defined as that the BS can satisfy the demand of real time connections, but does not have enough bandwidth for the non-real time connections. However, there are no rejected BRs in this stage. We can express this in terms of formulation as:

$$B_{all} = B_{rt} + \kappa B_{nrt}$$

where $0 \leq \kappa < 1$. Since the bandwidth for non-real time connections has been shrunk, there is a high probability that the CS accumulates non-real time data in queue. It leads to higher $P_r$ and $P_{recycle}$. Thus, the throughput gain can be more significant than Stage 1 and 2.

4) Stage 4 (Full Load):
This stage describes a network with the heaviest traffic load. The difference between stage 3 and 4 is that there are rejected BRs in stage 4. It means that the probability of SSs accumulating non-real time data in queue is much higher than the one in Stage 3. Therefore, both $P_r$ and $P_{recycle}$ are significantly high. Our scheme can achieve the best performance in this stage.

5.6 Tradeoff

In the IEEE 802.16 standard, the SS can adjust the amount of reserved bandwidth via BRs. In this subsection, we analyze the performance between the proposed scheme and the scheme with BRs. However, there are no rules specified in the standard to tell the SS when to adjust the amount of reserved bandwidth. One advantage of the present invention is the ability to improve the bandwidth utilization and system throughput. We define a case, named Case with BRs, that each SS requests bandwidth for each connection in every frame based on the queued data. The unicast polling opportunity is given to each connection in every frame for making BRs.

In this case, in each frame, the SS always asks the amount of bandwidth as the number of data it will transmits. Therefore, the amount of unused bandwidth in this case is very limited. However, the SS has to transmit a BR for every connection in every frame. Moreover, according to the IEEE 802.16 standard, the BR is made in per connection basis. Suppose there are m connections running on a SS. The SS has to send m BRs which are 19 m bytes (considering standard alone bandwidth requests) in each frame. The overhead is dramatically large in this case. Since the size of UL subframe is limited in each frame, the throughput for transmitting real data (i.e., eliminating the overhead) may not be high. On the other hand, in the proposed scheme, the overhead that each SS transmits is a constant (6 bytes for a RM) which is much smaller than 19 m bytes.

Since the CS needs to stay in active in order to listen to a possible RM from the corresponding TS, the CS cannot enter into sleep mode for power conservation. On the other hand, the probability of a CS to recycle the unused bandwidth decreases if a sleeping SS is scheduled as the CS. Therefore, there is a tradeoff between the benefit of the proposed scheme and power conservation. If the CS does not enter into sleep mode, obviously, it can always listen to a possible RM sent from the corresponding TS. On the other hand, it enters into sleep mode. The SS switches its state between active and inactive. As described in the IEEE 802.16e standard, the BS has the information of available and unavailable period of the SS. Thus, the BS should avoid to schedule a SS which is in unavailable period as a CS. Furthermore, if the BS schedules an inactive SS as a CS, the whole network still operates successfully but the benefit of the proposed scheme is reduced.

6. Simulation Results

Our simulation is conducted by using Qualnet 4.5 [11]. In this section, we first present our simulation model followed by introducing the definition of performance metrics used for measuring the network performance. The simulation results are shown as the third part of this section. At the end, we provide the validation of theoretical analysis and simulation results.

6.1 Simulation Model

Our simulation model comprises one BS residing at the center of geographical area and 50 SSs uniformly distributed in the service coverage of BS. The parameters of PHY and MAC layers used in the simulation are summarized in Table 1. PMP mode is employed in our model. Since our proposed scheme is used to recycle the unused bandwidth in UL subframe, the simulation only focuses on the performance of UL transmissions.

TABLE 1

The system parameters used in our simulation

| Parameters | Value |
| --- | --- |
| Node number | 51 (including BS) |
| Frame duration | 20 MS |
| UL/DL subframe duration | 10 MS |
| Modulation scheme | BPSK, QPSK, 16QAM, 64QAM |
| DCD/UCD broadcast interval | 5 S |
| TTG/RTG | 10US |
| SS transition gap (SSTG | 4US |

CBR is a typical traffic type used to measure the performance of networks in WiMAX research. However, it may not be able to represent the network traffic existing in real life. Moreover, the IEEE 802.16 network aims to serve both data and multi-media applications. Most of the modern streaming videos are encoded by industrial standards (e.g., H.264 or MPEG 4) which generate data in variant rates. In this research, we include VBR traffics to illustrate H.264 and MPEG 4-encoded videos. In our simulation, the traffic models for these streaming videos are based on related research [12] [13] [14]. Additionally, other commonly used VBR traffics such as HTTP and FTP applications are also included in our simulation. The characteristics of traffic types are summarized in Table 2.

In our simulation, each SS serves at least one and up to 5 connections. Each connection serves one type of traffic which is mapped to the scheduling classes supported in the IEEE 802.16 standards (i.e., UGS, rtPS, ertPS, nrtPS and BE). Table 2 enumerates all types of traffic and their corresponding scheduling classes used in our simulation. In particular, all VBR traffic in our simulation is considered as ON/OFF traffic. We fix the mean data rate of each application but make the mean packet size randomly selected from 512 to 1024 bytes. Thus, the mean packet arrive rate can be determined based on the corresponding mean packet size. As mentioned earlier, the size of each packet is modeled as Poisson distribution and the packet arrival rate is modeled as exponential distribution. For example, in order to simulate the network traffics more realistically, the start time of each connection is randomly selected from 0 to 15th second. Moreover, the real time connection stops to generate data from 75th to 100th second. It is for investigating the performance of our scheme when the large amount of unused bandwidth is available. Therefore, the number of active connections (the connections which are transmitting data) may be different during the simulation.

TABLE 2

The traffic model used in the simulation

| Application | VoIP | Multimedia | HTTP | FTP |
| --- | --- | --- | --- | --- |
| Traffic type | CBR | VBR | VBR | VBR |
| Scheduling class | UGS | rtPS | BE | nrtPS |
| Start Time (sec.) | m* | m* | m* | m* |
| End Time (sec.) | n* | n* | 100 | 100 |
| Mean Packet Size | 512 | z* | z* | z* |
| Mean Bit Rate | 12.2 kbps | 2 Mbps | 2 kbps | 50 Mbps |
| Max burst Size (Byte) | 31 | 7.5 k | 10 | 1500 k |
| Packet Size | Fixed | P* | P* | P* |
| Packet Arrival Rate | Fixed | E* | E* | E* |

Note:
m* is a random number between 0 and 15.
n* is a random number between 75 and 100
z* is a random number between 512 and 1024 bytes
P* stands for Poisson distribution
E* stands for Exponential distribution

6.2 The Performance Metrics

The simulation for evaluating the performance of the proposed scheme is based on the three metrics:

1) Throughput Gain (TG):
   It represents the percentage of throughput which is improved by implementing our scheme. The formal definition can be expressed as:

$$TG = \frac{T_{recycle} - T_{no\_recycle}}{T_{no\_recycle}}$$

where $T_{recycle}$ and $T_{no\_recycle}$ represent the throughput with and without implementing our scheme, respectively. The higher TG achieved shows the higher performance that our scheme can make.

2) Unused Bandwidth Rate (UBR):
   It is defined as the percentage of the unused bandwidth occupied in the total granted bandwidth in the system without using bandwidth recycling. It can be defined formally as:

$$UBR = \frac{B_{unused\_bw}}{B_{total\_bw}}$$

where $B_{unused\_bw}$ and $B_{total\_bw}$ are the unused bandwidth and total allocated-bandwidth, respectively. The UBR shows the room which can be improved by our scheme. The higher UBR means the more recycling opportunities.

3) Bandwidth Recycling Rate (BRR):
   It illustrates the percentage of bandwidth which is recycled from the unused bandwidth. The percentage can be demonstrated formally as:

$$BRR = \frac{B_{recycled}}{B_{unused\_bw}}$$

where $B_{recycled}$ is the bandwidth recycled from $B_{unused\_bw}$. BRR is considered as the most critical metric since it directly reveals the effectiveness of our scheme.

6.3 Simulation Results

Figure 8:
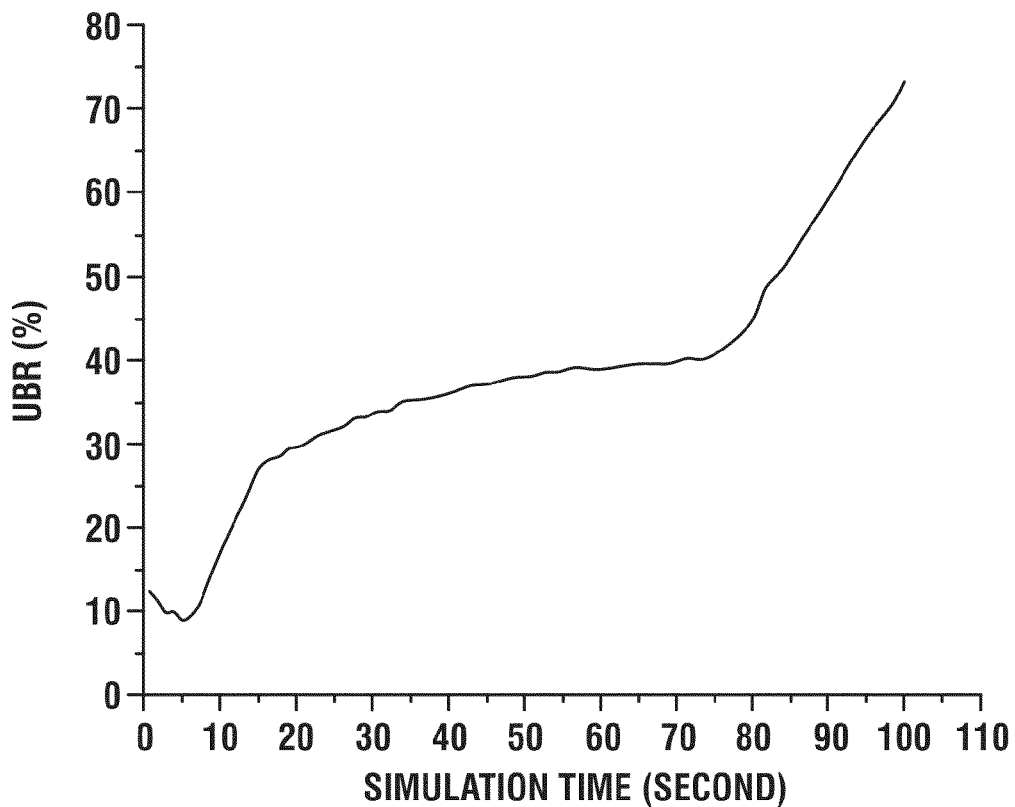
FIG. 8 illustrates simulation results of UBR.

FIG. 8 presents the percentage of the unused bandwidth in our simulation traffic model (i.e., UBR). It shows the room of improvement by implementing our scheme. From the simulation results, we conclude that the average UBR is around 38%. In the beginning, the UBR goes down. It is because each connection still requests bandwidth from the BS. As time goes on, the UBR starts to increase when the connection has received the requested bandwidth. After 75th second of simulation time, UBR increases dramatically due to the inactivity of real time connections. The purpose to have inactive real time connections is to simulate a network with large amount of unused bandwidth and evaluate the improvement of the proposed scheme in such network status. The evaluation is presented in the later of this section.

Figure 9:
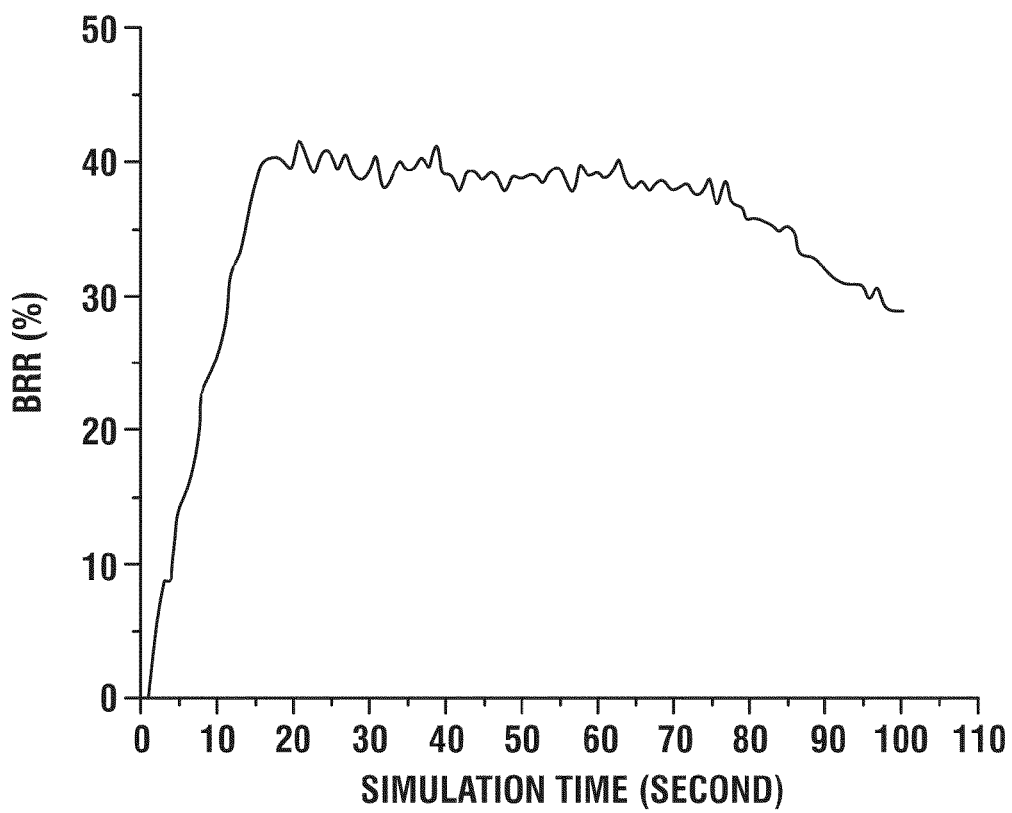
FIG. 9 illustrates simulation of results of BRR.

The simulation results of recycling rate are presented in FIG. 9. From the figure, we observe that the recycling rate is very close to zero at the beginning of the simulation. It is because that only a few connections transmit data during that time and the network has a light load. Therefore, only few connections need to recycle the unused bandwidth from others. As time goes on, many active connections join in the network. The available bandwidth may not be able to satisfy the needs of connections. Therefore, there is a high probability that the CS recycles the unused bandwidth. It leads a higher BRR.

Figure 10:
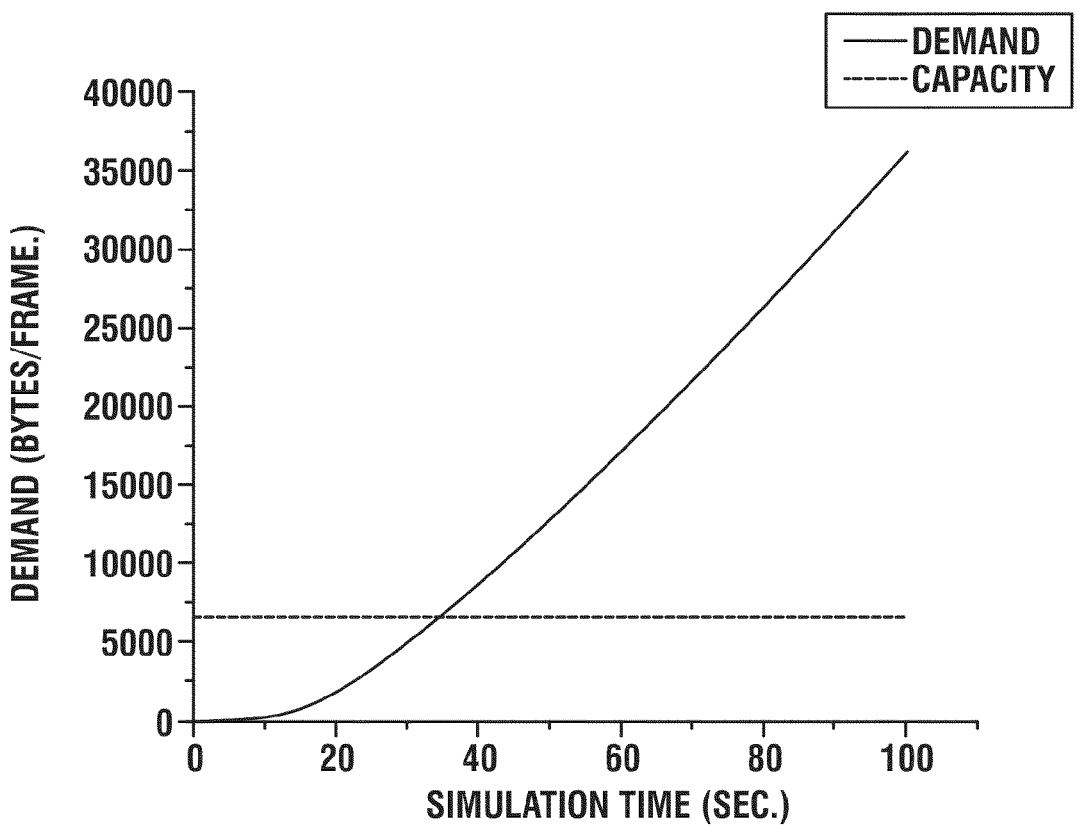
FIG. 10 illustrates total bandwidth demand.

FIG. 10 shows the total bandwidth demand requested by SSs during the simulation. In the figure, the dashed line indicates the system bandwidth capacity. During the simulation, the BS always allocates the bandwidth to satisfy the demand of real time connections due to the QoS requirement. Therefore, the amount of bandwidth allocated to non-real time connections may be shrunk. At the same time, the new non-real time data are generated. Therefore, the non-real time data are accumulated in the queue. It is the reason that the demand of bandwidth keeps increasing.

Figure 11:
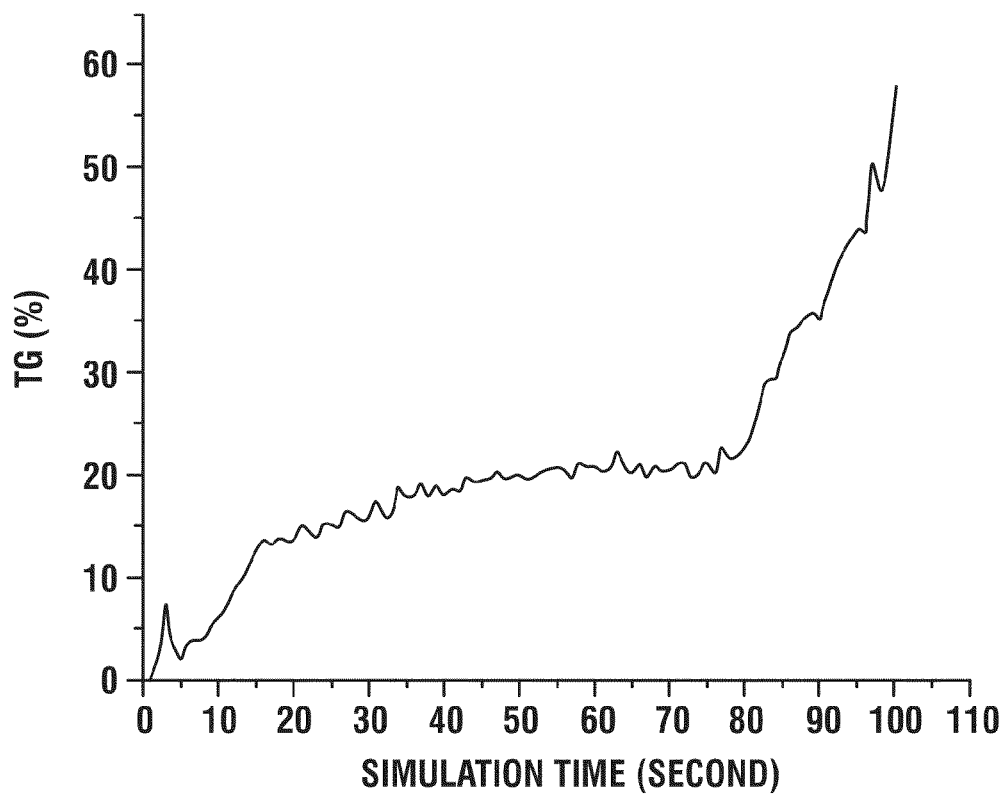
FIG. 11 illustrates simulation results of TG.

FIG. 11 presents the results of TG calculated from the cases with and without our scheme. In the figure, the TG is very limited at the beginning of the simulation, which is similar to the results of the BRR. It shows Stage 1 and 2 described in section 5 that there is no significant improvement on our scheme when the network load is light. As the traffic increases, the TG reaches around 15 to 20%. It is worth to note that the TG reaches around 20% at 35th second of the simulation time. It matches the time that the bandwidth demand reaches the system capacity shown in FIG. 10. Again, it confirms our early observation (Stage 3 and 4 in section 5) that the proposed scheme can achieve higher TG when the network is heavily loaded. After the 75th second, the TG increases dramatically. It shows that our scheme can have significant improvement on TG when the large amount of unused bandwidth is available.

We also investigate the delay in the cases with and without our scheme. By implementing our scheme, the average delay is improved by around 19% comparing to the delay without using our scheme. It is due to the higher overall system throughput improved by our scheme.

From the simulation results shown above, we conclude that the proposed scheme can not only improve the bandwidth utilization and throughput but also decrease the average delay. Moreover, the scheme reaches the higher performance when the network is heavily loaded. This validates our performance analysis shown in stage 1 to 4 in Section 5.

Figure 12:
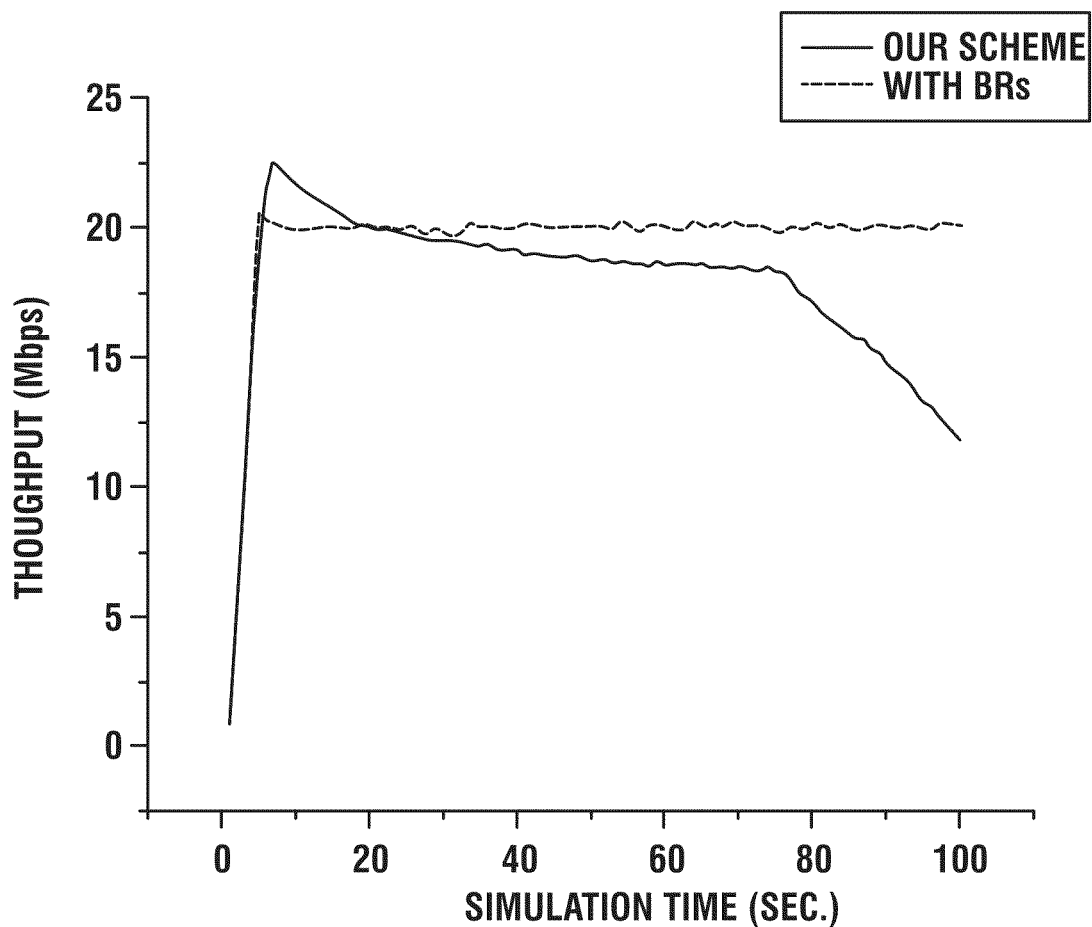
FIG. 12 illustrates comparison with the case with BRs.

FIG. 12 shows the throughput comparison between our scheme and Case with BRs defined in Section 5.6. From the figure, we obtain that the throughput of Case with BRs can maintain higher throughput than the proposed scheme in most of time but the achievable throughput of our scheme is higher. It is because the SS in the former case always requests bandwidth based on the number of queued data. However, the BS has to reserve sufficient amount of bandwidth for BRs. Therefore, it limits the number of bandwidth for data transmissions.

Additionally, this comparison is based on the proposed scheduling algorithm, named Priority-based Scheduling algorithm. The throughput of the proposed scheme is enhanced further by algorithms proposed later in Section 7.

6.4 Theoretical Analysis V.S. Simulation Results

In this subsection, we validate the theoretical analysis and simulation results of UBR and RMs coverage. To validate the UBR, we focus on the multimedia traffic specified in Table 2. The simulation model comprises one BS and one SS. The SS only serves one multimedia traffic specified. The simulation result shows that the UBR is around 35.99%. Moreover, the theoretical result calculated by equation (5) is about 35.29%. It is closed to the simulation result.

For validating the coverage of RMs, we employ the typical parameters used in IEEE 802.16 networks in our theoretical analysis. From equation (20), the theoretical percentage of RMs coverage is from 42 to 58%. Additionally, the result from our simulation is 48.7% which is within the range of our theoretical result.

To analyze the simulation results more profoundly, we investigate the two factors that the unused bandwidth fail to be recycled: 1) CSs cannot receive RMs sent by their corresponding TSs. 2) CSs do not have data to recycle the unused bandwidth while receiving RMs. According to our simulation results, the probability of failing to recycle the unused bandwidth is around 61.5% which includes both factors described above. By doing further investigation, we find that about 51.3% of failures is because the CS cannot receive a RM form the corresponding TS. The rest of failures, about 10.2%, are caused by no data to be transmitted while the CS receives a RM. Based on this observation, three scheduling algorithms are proposed in Section 7 to mitigate the affection of these factors for improving the recycling performance.

7. Further Enhancement

As our investigation, one of the factors causing recycling failures is that the CS does not have data to transmit while receiving a RM. To alleviate this factor, we propose to schedule SSs which have rejected BRs in the last frame because it can ensure that the SS scheduled as CS has data to recycle the unused bandwidth. This scheduling algorithm is called Rejected Bandwidth Requests First Algorithm (RBRFA). It is worth to notice that the RBRFA is only suitable to heavily loaded networks with rejected BRs sent from non-real time connections (i.e., nrtPS or BE). Notice that only rejected BRs sent in the last frame are considered in the RBRFA for scheduling the current frame. The RBRFA is summarized in Algorithm 2.

The BS grants or rejects BRs based on its available resource and scheduling policy. In RBRFA, if the BS grants partially amount of bandwidth requested by a BR, then this BR is also considered as a rejected BR. Similar to Algorithm 1, $O_t$ represents the set of SSs which transmission period overlaps with the TS, $S_t$, in QR. All SSs in $Q_t$ are considered as possible CSs of $S_t$. A rejected BR shows that the SS must have extra data to

| Algorithm 2 Rejected Bandwidth Requests First Algorithm |
| --- |
| Input: T is the set of TSs scheduled on the UL map.<br>$Q_R$ is the set of SSs which have rejected BRs sent from non-real time connections in the last frame.<br>Output: Schedule CS for each TS in T.<br>For i = 1 to $\|T\|$ do<br>  a. $S_t \leftarrow TS_i$<br>  b. $Q_t \leftarrow Q_R - O_t$<br>  c. Randomly pick a SS $\in Q_t$ as the corresponding CS of $S_t$<br>End For | be transmitted in the next frame and no bandwidth is allocated for these data. The RBRFA schedules those SSs as CSs on the CL, so the probability to recycle the unused bandwidth while the CS receives the RM is increased.

The other factor that may affect the performance of bandwidth recycling is the probability of the RM to be received by the CS successfully. To increase this probability, a scheduling algorithm, named history-Based Scheduling Algorithm (HBA), is proposed. The HBA is summarized in Algorithm 3. For each TS, the BS maintains a list,

| Algorithm 3 History-Based Scheduling Algorithm | |
|---|---|
| Input: | T is the set of TSs scheduled on the UL map. |
| | Q is the set of SSs running non-real time applications |
| | BL is the set of black lists of TSs. |
| Output: | Schedule a CS for each TS in T. |
| For i = | 1 to ‖T‖ do |
| | a. $S_t \leftarrow TS_i$ |
| | b. $Q_t \leftarrow Q - O_t - BL_i$ |
| | c. Randomly pick a SS ∈ $Q_t$ as the corresponding CS of $S_t$ |
| | d. IF the scheduled CS did not transmit data or SBV Then put this CS in the $BL_i$ |
| End For | | called Black List (BL). The basic CID of a CS is recorded in the BL of the TS if this CS cannot receive RMs sent from the TS. According to our protocol, the CS transmits data or pad the rest of transmission interval if a RM is received. The BS considers that a CS cannot receive the RM from its corresponding TS if the BS does not receive either data or padding information from the CS. When the BS schedules the CS of each TS in future frames, the BS only schedules a SS which is not on the BL of the TS as the CS. After collecting enough history, the BL of each TS should contains the basic CID of all SSs which cannot receive the RM sent from the TS. By eliminating those SS, the BS should have high probability to schedule a CS which can receive the RM successfully. Therefore, HBA can increase the probability of scheduling a SS which is able to receive the RM as the CS.

To support the mobility, the BL of each TS should be updated periodically. Moreover, the BS changes the UL burst profile of the SS when it cannot listen to the SS clearly. There are two possible reasons which may make the BS receive signals unclearly: 1) the SS has moved to another location. 2) the background noise is strong enough to interfere the data transmissions. Since those two factors may also affect the recipient of RMs, therefore, the BL containing this SS should be updated as well.

The two algorithms described above focus on mitigating each factor that may cause the failure of recycling. The RBRFA increases the probability that the CS has data to transmit while receiving the RM. The HBA increases the probability that the CS receives the RM. However, none of them can alleviate both factors at the same time. By taking the advantages of both RBRFA and HBA, an algorithm called Hybrid Scheduling Algorithm (HSA) is proposed. HSA can increase not only the probability of CSs to transmit data while receiving the RM but also the probability of CSs to receive the RM. The detail of HAS is summarized in Algorithm 4.

| Algorithm 4 Hybrid Scheduling Algorithm | |
|---|---|
| Input: | T is the set of TSs scheduled on the UL map. |
| | $Q_R$ is the set of SSs which have rejected BRs sent for non-real time applications. |
| | BL is the set of black lists of TSs. |
| Output: | Schedule a CS for each TS in T. |
| For i = | 1 to ‖T‖ do |
| | a. $S_t \leftarrow TS_i$ |
| | b. $Q_t \leftarrow Q_R - O_t - BL_i$ |
| | c. Randomly pick a SS ∈ $Q_t$ as the corresponding CS of $S_t$ |
| | d. IF the scheduled CS did not transmit data or SBV Then put this CS in the $BL_i$ |
| End For | |

When the BS schedules the CS for each TS, only the SS with rejected BRs is considered. As mentioned before, it increases the probability of CSs to transmit data while receiving the RM. Moreover, the BS maintains a BL for each TS. It can screen out the SSs which can not receive the RM so that those SS cannot be scheduled as the CSs. The probability of receiving RMs can be increased. Again, the BL of each TS should be updated periodically or when the UL burst profile of the SS has been changed. By considering those two advantages, HSA is expected to achieve higher TG and BBR comparing to RBRFA and HBA.

8. Simulation Results of Enhancement

Figure 13:
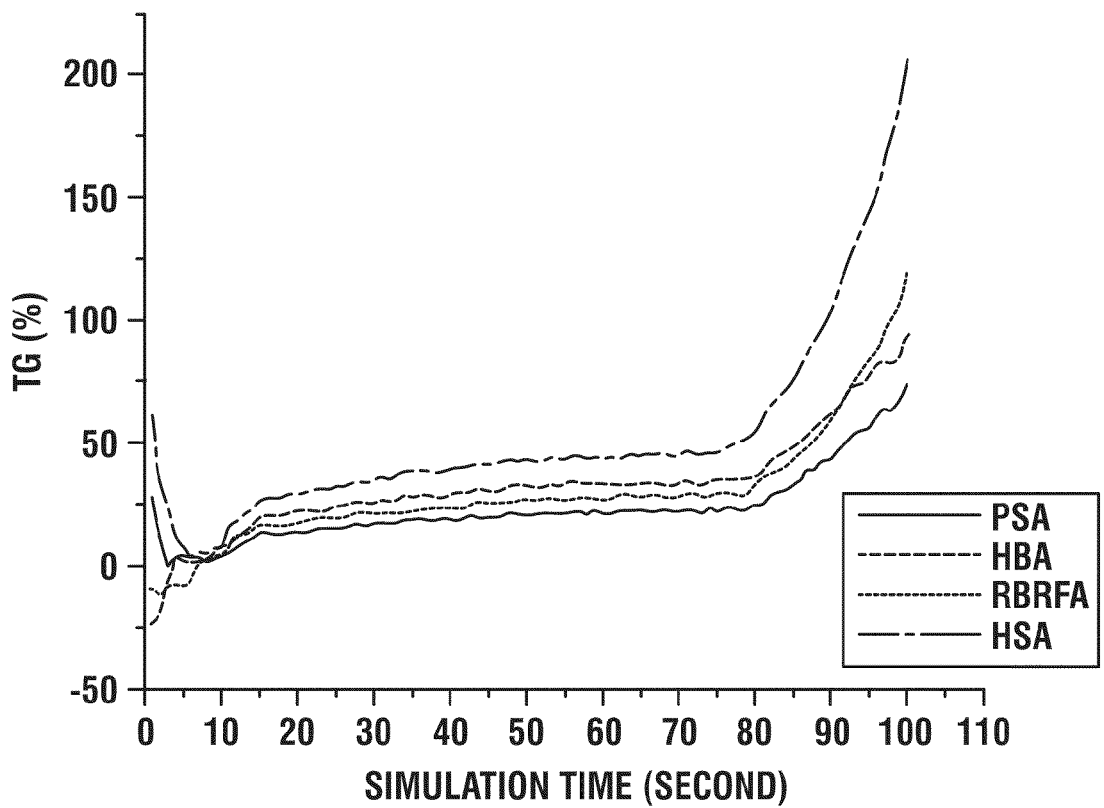
FIG. 13 illustrates simulation results of TG among all scheduling algorithms.

The simulation model for evaluating these scheduling algorithms is same as the model presented in section 6. The BS is located at the center of a geographical area. There are 50 SSs uniformly distributed in the service coverage of BS. Each SS serves at least one and up to 5 connections. The simulation results of TG is shown in FIG. 13. Before the 15th second of simulation time, the TG may be negative. It means the throughput without recycling is higher than the throughput with recycling. It is because the applications of each SS start to generate data randomly in the first 15 seconds of simulation time. As described before, the PSA shown as Algorithm 1 can achieve averagely 20% of throughput. The RBRFA can further improve the throughput to 26% because of increasing the chance of transmitting data while the CS receives the RM. Moreover, the HBA can have a greater improvement on TG to 30%. It shows that the factor of missing RMs causes more failures of recycling than the factor of no data transmissions while the CS receives the RM does. This result consists with our observation in section 6 that the probability of missing RMs is higher than the probability that the CS cannot recycle the unused bandwidth due to the lack of data to be transmitted. Moreover, HSA achieves the best performance on TG (averagely 45% improvement) since it combines both advantages of HBA and RBRFA.

Figure 14:
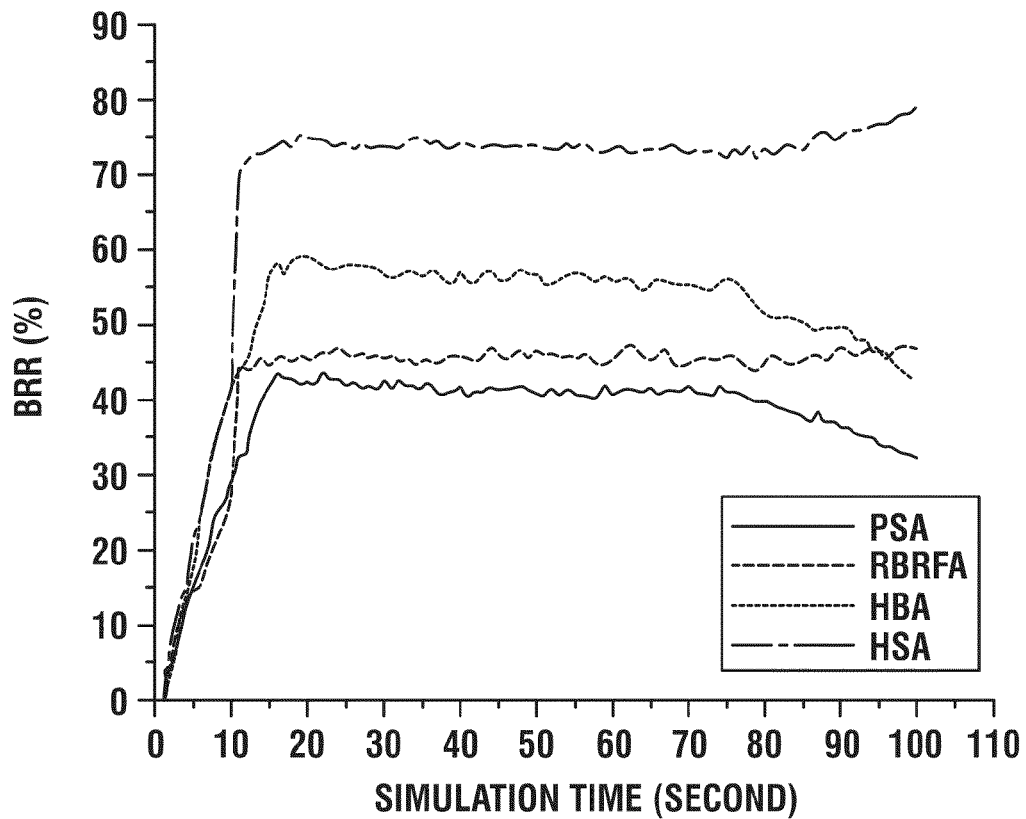
FIG. 14 illustrates simulation results of BBR among all scheduling algorithms.

The comparison of BRR is shown in FIG. 14. The results consist with the results of TG shown above. The HSA has the highest BBR. Moreover, the HBA achieves the higher BBR than the RFA does. Additionally, it is worth noting that the BRR of the RRFA can not be more than 50% even when the network is fully loaded. It is because, based on our investigation in section 6, there is only 48.7% of probability that a CS can receive a RM successfully.

Figure 15:
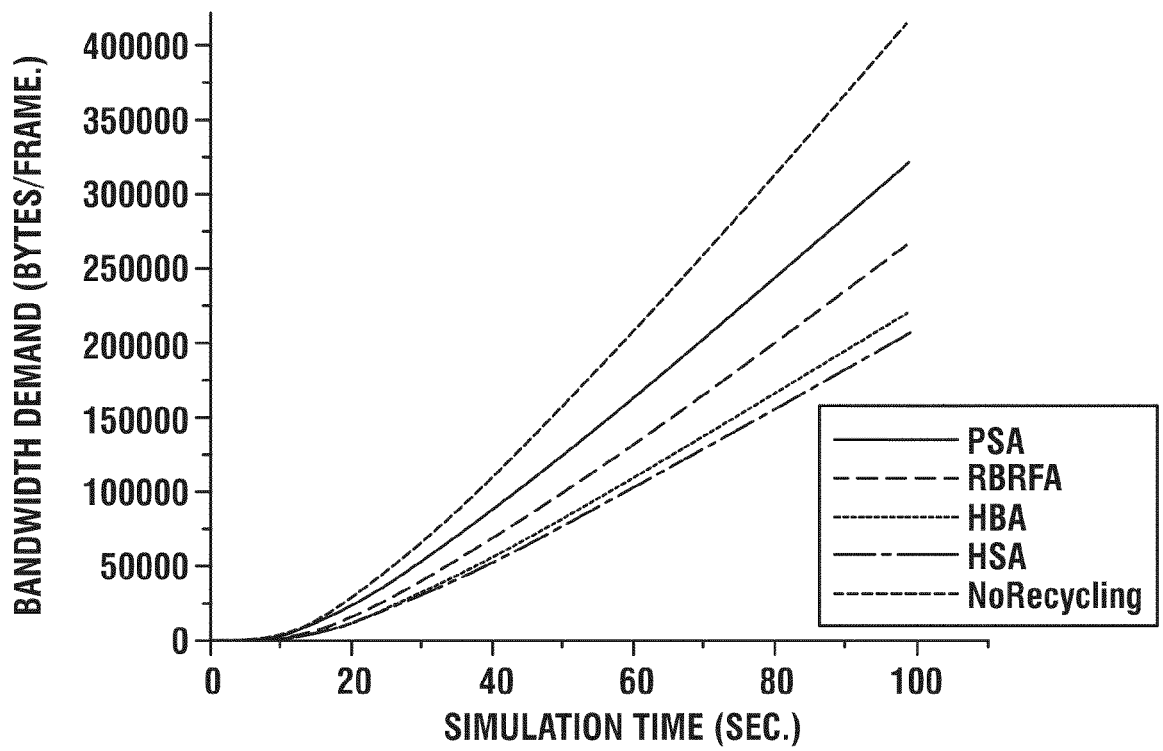
FIG. 15 illustrates simulation results of bandwidth demand.

The comparison of the total bandwidth demand is shown in FIG. 15. From the figure, the increasing speed of bandwidth demand from low to high is HSA, HBA, RBRFA, PSA and No Recycling. This result matches the result of TG. It is because that there are fewer data accumulated in the queue when the TG is higher. It leads to less bandwidth demand.

Figure 16:
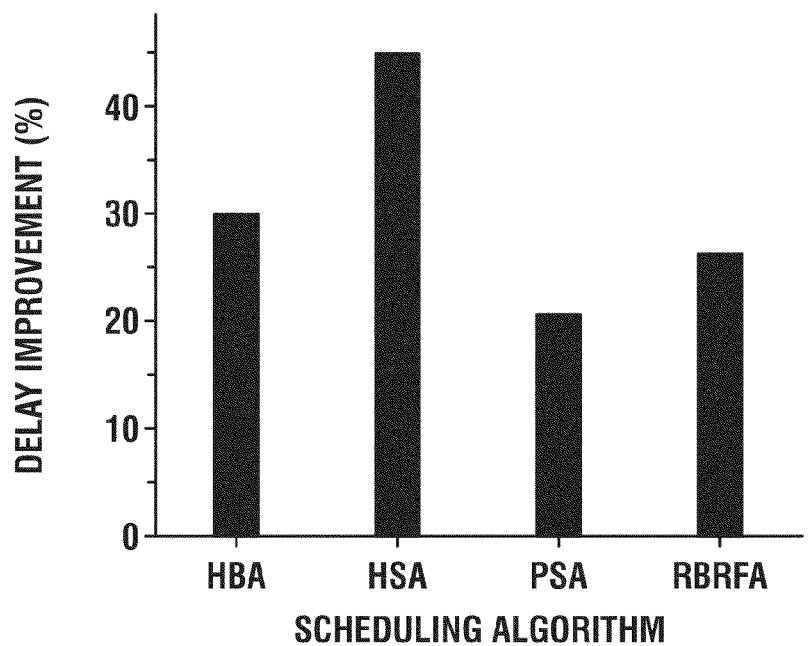
FIG. 16 illustrates simulation results of delay improvement.

Due to the improvement of throughput, the average delay is also improved. The summary of delay improvement is shown in FIG. 16. Similar to the simulation results of TG and BRR, The HSA has the best improvement on delay due to the highest throughput it achieves.

9. Conclusions

Variable bit rate applications generate data in variant rates. It is very challenging for SSs to predict the amount of arriving data precisely. Although the existing method allows the SS to adjust the reserved bandwidth via bandwidth requests in each frame, it cannot avoid the risk of failing to satisfy the QoS requirements. Moreover, the unused bandwidth occurs in the current frame cannot be utilized by the existing bandwidth adjustment since the adjusted amount of bandwidth can be applied as early as in the next coming frame. Our research does not change the existing bandwidth reservation to ensure that the same QoS guaranteed services are provided. We proposed bandwidth recycling to recycle the unused bandwidth once it occurs. It allows the BS to schedule a complementary station for each transmission stations. Each complementary station monitors the entire UL transmission interval of its corresponding TS and standby for any opportunities to recycle the unused bandwidth. Besides the naive priority-based scheduling algorithm, three additional algorithms have been proposed to improve the recycling effectiveness. Our mathematical and simulation results confirm that our scheme can not only improve the throughput but also reduce the delay with negligible overhead and satisfy the QoS requirements.

Thus, methods, apparatus, and systems for improved networks and network communications have been disclosed. The present invention contemplates numerous embodiments, variations, options, and alternatives. These include, without limitation, variations in the type of scheduling used, variations in the protocols used, variations in the type of network devices, and other variations. For example, although discussed primarily I the context of IEEE 802.16 networks, the same methodology may be used in other types of networks including Long Term Evolution (LTE) networks and other networks which provide for wireless access. The present invention is not to be limited to the specific disclosure provided herein.

REFERENCES

Each of these references is incorporated by reference in their entirety:

[1] IEEE 802.16 WG, "IEEE Standard for Local and Metropolitan Area Network Part 16: Air Interface for Fixed Boardband Wireless Access Systems" IEEE Std 802.16-2004 pol-p. 857
[2] IEEE 802.16WG, "IEEE standard for local and metropolitan area networks part 16: Air interface for fixed and mobile broadband wireless access systems, Amendment 2," IEEE 802.16 Standard, December 2005.
[3] Jianhua He, Kun Yang and Ken Guild "A Dynamic Bandwidth Reservation Scheme for Hybrid IEEE 802.16 Wireless Networks" ICeOB p. 2571-2575.
[4] Kamal Gakhar, Mounir Achir and Annie Gravey, "Dynamic resource reservation in IEEE 802.16 broadband wireless networks", IW QoS, 2006. p. 140-148
[5] J. Tao, F. Liu, Z. Zeng, and Z. Lin, Throughput enhancement in WiMax mesh networks using concurrent transmission, In Proc. IEEE Int. Conf. Wireless Commun., Netw. Mobile Comput., 2005, p. B71VB74.
[6] Xiaofeng Bai, Abdallah Shami and Yinghua Ye "Robust QoS Control for Single Carrier PMP Mode IEEE 802.16 Systems", IEEE TRANSACTIONS ON MOBILE COMPUTING, VOL. 7, No. 4, APRIL 2008. pA16-429
[7] Eun-Chan Park, Hwangnam Kim, Jae-Young Kim, Han-Seok Kim "Dynamic Bandwidth Request-Allocation Algorithm for Real-time Services in IEEE 802.16 Broadband Wireless Access Networks", INFOCOM 200B. p. 852-860
[8] Thomas G. Robertazzi "Computer Networks and Systems: Theory and Performance Evaluation." Springer-Verlag 1990
[9] Kamal Gakhar, Mounir Achir and Annie Gravey, "How Many Traffic Classes Do We Need In WiMAX?," WCNC 2007. p. 3703-3708
[10] Giuseppe Iazeolla, Pieter Kritzinger and Paolo Pileggi, "Modeling quality of service in IEEE 802.16 networks," SoftCOM 2008. p. 130-134
[11] Qualnet.http://www.scalable-networks.com/products/developer/new_in35.php
[12] Frank H. P. Fitzek, Martin Reisslein, "MPEG-4 and H.263 Video Traces for Network Performance Evaluation", IEEE Network, Vol. 15, No. 6. pAD-54, November/December 2001
[13] Patrick Seeling, Martin Reisslein, and Beshan Kulapala, "Network Performance Evaluation Using Frame Size and Quality Traces of Single-Layer and Two-Layer Video: A Tutorial", IEEE Communications Surveys and Tutorials, Vol. 6, No. 2 p. 58-78, Third Quarter 2004
[14] Geert Van der Auwera, Prasanth T. David, and Martin Reisslein, "Traffic and Quality Characterization of Single-Layer Video Streams Encoded with H.264/AVC Advanced Video Coding Standard and Scalable Video Coding Extension", IEEE Transactions on Broadcasting Vol. 54, No. 3 p. 698-718 September 2008.

The invention claimed is:

1. A method for use in a broadband wireless access protocol in a network to provide bandwidth recycling within a current frame, the method comprising:
   scheduling by a base station a complementary stand-by subscriber station for each subscriber station with uplink (UL) transmission opportunities to form a complementary list;
   transmitting by the base station and over the network, the complementary list at a beginning of the current frame;
   communicating to the base station by a subscriber station with unused bandwidth that there is unused bandwidth within the current frame by transmitting a stuff byte value;
   communicating to a corresponding complementary stand-by subscriber station by the subscriber station with unused bandwidth, a releasing message within the current frame to inform the corresponding complementary subscriber station to recycle the unused bandwidth, thereby releasing the unused bandwidth for use by the complementary stand-by subscriber station within the current frame.

2. The method of claim 1 wherein the network is an IEEE 802.16 network.

3. The method of claim 1 wherein the scheduling is performed using a priority-based scheduling algorithm.

4. The method of claim 1 wherein the scheduling is performed using a rejected bandwidth requests first algorithm.

5. The method of claim 1 wherein the scheduling is performing using a history-based scheduling algorithm.

6. The method of claim 1 wherein the scheduling is performed using a hybrid scheduling algorithm.

7. A system for communication over a network which provides for bandwidth recycling within a frame, the system comprising:
   a base station;
   a plurality of subscriber stations;
   a plurality of complementary subscriber stations;

wherein the base station is configured for scheduling a complementary subscriber station for each of the plurality of subscriber stations and communicating a complementary list containing the complementary subscriber stations at a beginning of a frame;

wherein each of the subscriber stations is configured for sending a stuff by value within the frame to the base station using a first type of modulation if the subscriber station has unused bandwidth in the frame;

wherein each of the subscriber stations is configured for sending using a second type of modulation, a releasing message within the frame to a corresponding complementary subscriber station to inform the corresponding complementary subscriber station to recycle the unused bandwidth in the frame.

8. The system of claim 7 wherein the network is an IEEE 802.16 network.

9. The system of claim 7 wherein the scheduling is performed using a priority-based scheduling algorithm.

10. The system of claim 7 wherein the scheduling is performed using a rejected bandwidth requests first algorithm.

11. The system of claim 7 wherein the scheduling is performing using a history-based scheduling algorithm.

12. The system of claim 7 wherein the scheduling is performed using a hybrid scheduling algorithm.

13. The system of claim 7 wherein the complementary list is communicated after a UL-MAP.

14. The system of claim 7 wherein the first type of modulation is QPSK and the second type of modulation is BPSK.

* * * * *